(12) United States Patent
Deimel et al.

(10) Patent No.: US 7,383,267 B2
(45) Date of Patent: Jun. 3, 2008

(54) STANDARDIZED INTEGRATION MODEL FOR DISTRIBUTED BUSINESS PROCESSES

(75) Inventors: Anton Deimel, Malschenberg (DE); Manfred Zizlsperger, Schriesheim (DE); Joerg Ackermann, Dossenheim (DE)

(73) Assignee: SAP AG, Walldorf (DE)

( * ) Notice: Subject to any disclaimer, the term of this patent is extended or adjusted under 35 U.S.C. 154(b) by 454 days.

(21) Appl. No.: 11/095,897

(22) Filed: Mar. 30, 2005

(65) Prior Publication Data

US 2006/0230047 A1    Oct. 12, 2006

(51) Int. Cl.
*G06F 17/00* (2006.01)
(52) U.S. Cl. .................. 707/100; 707/1; 707/10; 707/101; 709/226; 717/104
(58) Field of Classification Search ............. 707/1–10, 707/100–104.1, 200–206; 709/203, 217, 709/219, 226, 332, 233, 234; 717/102–104; 105/4, 7, 8; 705/4, 7, 8
See application file for complete search history.

(56) References Cited

U.S. PATENT DOCUMENTS 6,816,902 B1 *  11/2004  Bandat et al. .............. 709/226
2002/0138582 A1 *  9/2002  Chandra et al. ............ 709/206

OTHER PUBLICATIONS

Janos Sztipanovits et al., Multigraph: An Architecture for Model-Integrated Computing, 1995, IEEE, 361-368.*
Jonathan S. Whalen et al., Finding Maximal Disjoint Paths in a Multigraph, 1990, IEEE, 403.6.1-403.6.5.*
Zupan et al., Optimization of rule-based systems using state space graphs, 3-4/1998, IEEE, vol. 10, 238-254.*
Frank Leymann et al., Business Process Management With FlowMark, 1994, IEEE, 230-234.*

* cited by examiner

*Primary Examiner*—Jean B Fleurantin
(74) *Attorney, Agent, or Firm*—Mintz, Levin, Cohn, Ferris, Glovsky & Popeo, P.C.

(57) ABSTRACT

A system and method for integrating distributed business processes that govern message exchange between loosely coupled business applications. The system and method includes the use of an integration scenario. The integration scenario includes a delivery integration model that defines one or more design time business processes. The integration scenario further includes a configuration integration model that defines a runtime configuration of the one or more design time business process. Transformation modules are provided to transform the integration scenario from the delivery integration model to the configuration integration model, and vice versa.

12 Claims, 6 Drawing Sheets

STANDARDIZED INTEGRATION MODEL FOR DISTRIBUTED BUSINESS PROCESSES

BACKGROUND

Many companies are re-engineering their enterprise computing systems to be more effective and productive. However, even these companies must continue to integrate with legacy computing systems at their partners. Consequently, enterprise computing systems must be able to run in a distributed and heterogeneous environment, performing complex single tasks in parallel. This need is increasingly being met through the use of workflow-based applications, i.e. software applications executing specific and defined business processes, which are executable modules of code that perform a predefined business function.

Companies need to be continually more flexible to react to ever-changing business conditions. For example, companies using business process-based workflow applications must have the ability to adapt quickly to changes and/or upgrades of existing business processes. Also, the time required for execution of business processes must be minimized, and their execution made more resource-efficient.

The drive for efficiency can make business process management inflexible and not configurable to dynamic company-specific needs. For instance, a business process can be defined according to a process definition, represented by a process graph in a workflow builder tool, and then delivered to a customer for storage and execution. Workflows can be designed for any number of business processes.

Distributed business processes lack conventionally lack a standardized integration model that can be used to configure, integrate and monitor the message exchange between loosely coupled or heterogeneous business applications. Customers want to monitor cross-component business processes. One challenge is to monitor cross-component business processes of loosely coupled and business processes distributed across business systems or applications. For the monitoring, a customer needs a standardized integration model for the distributed business processes as well as a monitoring process.

SUMMARY

A system for integrating distributed business processes that govern message exchange between loosely coupled business applications is disclosed. The system includes an integration model having a delivery model that defines one or more design time business processes and a configuration model that defines a runtime configuration of the one or more design time business process.

In another embodiment, an integration scenario for integrating distributed business processes that govern message exchange between loosely coupled business applications includes a delivery integration model that defines one or more design time business processes, and a configuration integration model that defines a runtime configuration of the one or more design time business process.

The delivery integration model includes an aggregated multigraph having a number of roles connected by message exchange connections. The delivery integration model includes an aggregated multigraph having a number of roles connected by message exchange connections. The configuration integration model includes an expanded multigraph having a number of events and roles connected by message exchange connections.

The integration scenario further includes a transformation module configured to transform a delivery integration model to a configuration integration model. The transformation module includes a first transformation module configured to transform the aggregated multigraph to the expanded multigraph, and a second transformation module configured to transform the expanded multigraph to the aggregated multigraph.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document discloses a standardized integration model for distributed business processes. The integration model includes two models: a delivery model and a configuration model. The delivery model is used to describe the business process during design time, and the configuration model is used to configure the business process for runtime. The integration model is includes an aggregated multigraph and an expanded multigraph. The aggregated multigraph forms the basis for the delivery model and the expanded multigraph forms the basis for the configuration model.

The mathematical model includes a transformation from an aggregated multigraph to an expanded multigraph, and from an expanded multigraph to an aggregated multigraph. When used in the integration model, these transformations allows a user to automate the integration configuration for distributed business processes.

Figure 1:
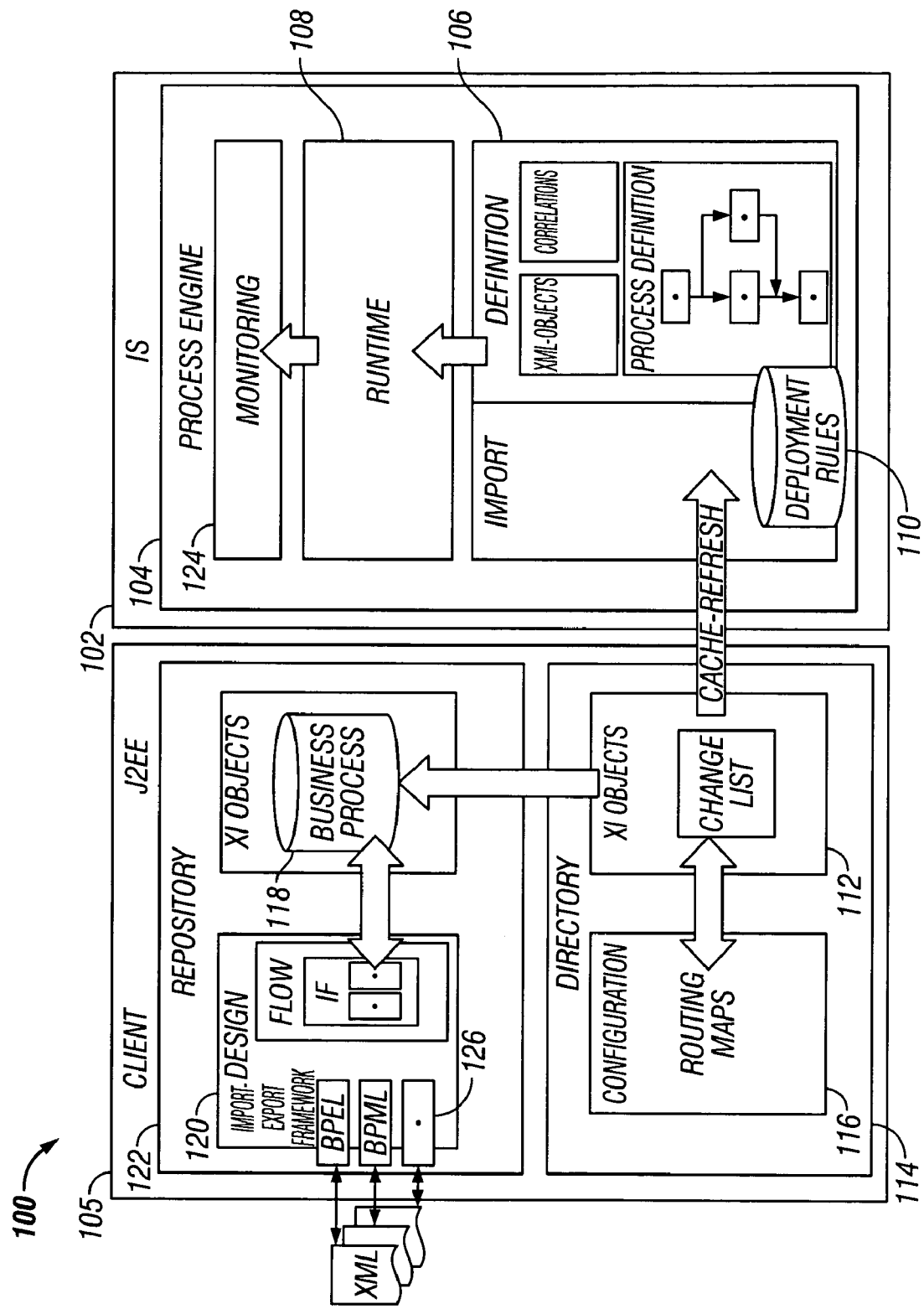
FIG. 1 depicts a functional block diagram of a business process management system

FIG. 1 depicts a functional block diagram of a business process management system 100. The system 100 includes a process engine 104 integrated in an integration server 102. The process engine 104 and integration server 102, as they are called in their runtime configurations, are also respectively known as a process editor and an integration builder in their "definition time" configurations. Process definition 106 and BPM runtime 108 in the BPM system 100 are based on different development platforms. For instance, the process definition 106 is based on Java, such as a J2EE platform 105, and the runtime 108 is based on ABAP. The BPM system 100 includes monitoring and administration tools 124 on the integration server 102.

The process definition 106 module utilizes XML objects and correlations to define processes, based on deployment rules imported from XI objects 112 from the integration directory 114. The XI objects 112 are based on the routings and mappings defined for the system runtime configuration 116. The XI objects 112 are also used to define business processes 118 in the integration repository 122, and the design-time configuration 120 of the system landscape.

Business processes 118 are integrated with and linked with other objects and tools in the integration repository 122. Business processes 118, in the form of patterns and templates, can be delivered to customers. Application-specific content can also be delivered. The BPM system 100 includes an import/export framework 126 that imports and exports standards-based adapters for universal connectivity. The BPM system 100 can include an interface for receiving user-specified business process details.

Business process modeling scenarios, called "patterns," are high-level building blocks that can be combined with each other and with atomic functions such as deadlines, exceptions, etc. of the process engine 104. The following are example patterns:

1) Send and Receive: Sending messages controlled by the process engine 104 is often combined with receive steps that wait for a correlated response message. A receive step should wait for the messages starting with the activation of the associated correlation as a queuing mechanism.

2) Serialization: This pattern can include the following steps: 1. Receive messages and store them locally in the process data context; 2. Keep the data context and start sending received messages when a certain condition has been fulfilled; and 3. Send received messages in a given order respecting dependencies of receivers. This third step can be: a. Without caring about responses/acknowledgements ("fire and forget"); or b. Receiving a response or an acknowledgement (enables serialization). The process engine 104 can be configured to wait for a technical ACK of or business response from a previously-sent message before sending a next message.

3) Transformations/Merge/Split: The process engine 104 transforms messages within the process context. The following transformations can be performed: 1. (N:1) Transform several collected messages to one new message (e.g. transform several invoices to one combined invoice or transform PO header and several PO positions into one PO); 2. (1:N) Transform one message into several other messages (e.g. transform a combined invoice to invoice respecting the original POs); and 3. (1:1) is a special case of the transformations described above. N:M mappings are also possible if needed.

4) Multicast: The process engine 104 can be configured to calculate the receivers of a message (also using content-based conditions) and to send the message to these receivers, either without regard to responses/acknowledgements ("fire and forget") or based on receiving a number of responses/acknowledgements. Messages may be sent out in parallel or sequentially.

5) Collect: This pattern uses receive steps in which an arbitrary number of messages can be received. From a process point of view, the end of the collecting scenario can be defined via "push," (i.e. a certain condition is reached, such as N messages have arrived, a certain deadline has been reached, etc.), or "poll" in which the process engine waits for a special message that indicates the end of collecting.

The process definition 106 is based on the standardized integration model. The standardized integration model for distributed business processes is defined according to multigraphs with special properties, including vertex and edge categories, and classification rules. In the description below, G* represents an aggregated multigraph, G represents an expanded multigraph, T is an aggregation function, and T' is an expansion function. These representations apply to both the delivery and configuration models, as well as the transformation between delivery and configuration models.

The expanded multigraph can be represented at a starting point as G=(V, E) with V={v|v is a vertex}, where E={e|e is an edge}. The set of vertices can be categorized as follows: V*={v*|v* is a vertex category}=set of all vertex categories. Each vertex v ∈V belongs to exactly one vertex category v* ∈V*. Classification rule $K_v$: V→V* assigns each vertex v its vertex category v*. Classification rule $K_v'$: V*→P(V) assigns each vertex category v* all assigned vertices. Note that the name V* is used for the vertex category in line with the names of the aggregated multigraphs.

The set of edges can be categorized as follows: C={c|c is an edge category}=set of all edge categories. Each edge e ∈E belongs to exactly one edge category c ∈C. Classification rule $K_E$: E→C assigns each edge e its edge category c, and classification rule $K_E'$:C→P(E) assigns each edge category c all assigned edges.

Figure 2:
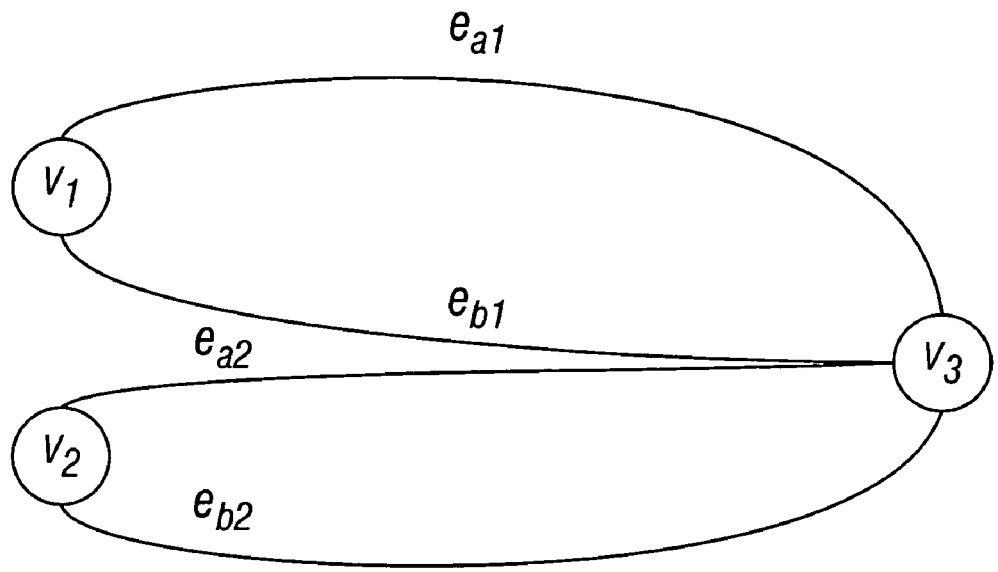
FIG. 2 illustrates an example of an expanded multigraph.

FIG. 2 shows an example of an expanded multigraph G=(V, E), where V={$V_1$, $v_2$, $V_3$} and E={$e_a1$, $e_b1$, $e_a2$, $e_b2$}. Based on the expanded multigraph G, there are two vertex categories: $v^*_1$ comprises $v_1$ and $v_2$; $v^*_2$ comprises $V_3$. There are also two edge categories: $c_a$ comprises $e_{a1}$ and $e_{a2}$; $c_b$ comprises $e_{b1}$ and $e_{b2}$. The expanded multigraph has several conditions. One condition is uniqueness: no two edges have both the same (connecting) vertices and the same edge category. That is, for $e_1$=($v_{1i}$, $v_{1j}$) and $e_2$=($v_{2i}$, $v_{2j}$) ∈E the following applies: $v_{1i} \neq v_{2i}$ or $v_{1j} \neq v_{2j}$ or $K_E(e_1) \neq K_E(e_2)$. Each edge e=($v_i$, $v_j$) ∈E can be represented uniquely as e=($v_i$, $v_j$)$_c$, where c=$K_E$(e)

Another condition is category: all edges of an edge category connect the vertices of the same vertex categories. That is, edges ($v_1$, $v_j$)$_c$ and ($v_k$, $v_l$)$_c$ exist →$K_v(v_k)$=$K_v(v_i)$ and $K_v(v_l)$=$K_v(v_j)$. Yet another condition is completeness: if an edge of category c exists between two vertices, then edges of the category c exist for all pairs of the corresponding vertex categories. That is, edge ($v_1$, $v_j$)$_c$exists→edge ($v_k$, $v_l$)$_c$ exists for all $v_k$ with $K_v(v_k)$=$K_v(v_i)$ and all $v_l$ with $K_v(v_l)$=$K_v(v_j)$.

Figure 3:
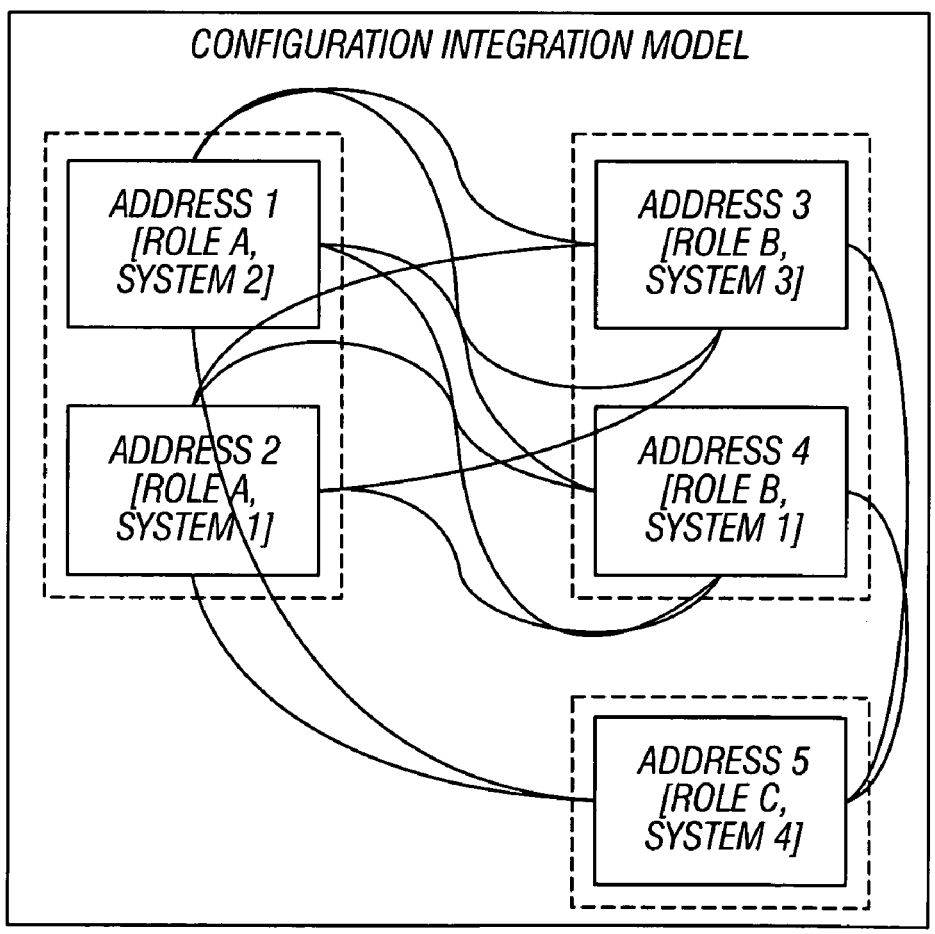
FIG. 3 illustrates a configuration integration model.

The multigraph G is used to define the configuration model of the integration model, and has the following properties: G=(V, E), where V={v|v is a vertex corresponding to an address} and E={e|e is an edge corresponding to an interface between the addresses}, as shown in FIG. 3.

Figure 4:
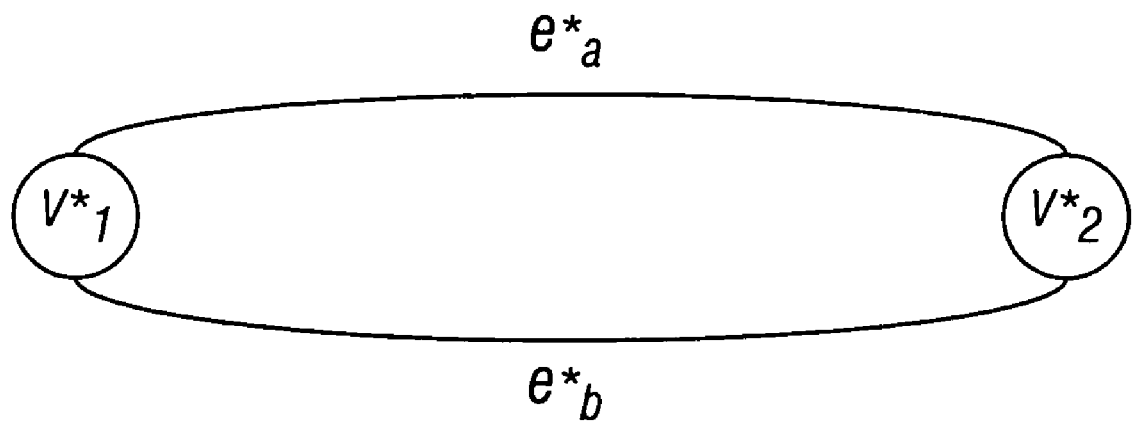
FIG. 4 illustrates an example of an aggregated multigraph.

An aggregated multigraph G* is derived from the expanded multigraph G, where G*=(V*, E*) with V*={v*|v* is a vertex category} and E*:={($v^*_x$, $v^*_y$)$_c$|c ∈C; $v^*_x$, $V^*_y$ ∈V*; edges of category c connect vertices of categories $v^*_x$ and $v^*_y$}. The aggregated multigraph G* has several properties. The aggregated multigraph G* is an abstraction of the expanded multigraph G. C and E* are equivalent. Further, transformations from G*-G and from G-G* are structure-preserving. FIG. 4 illustrates an example of an aggregated multigraph G*=(V*, E*), where V*={v*1, v*2} and E*={e*a, e*b}.

Figure 5:
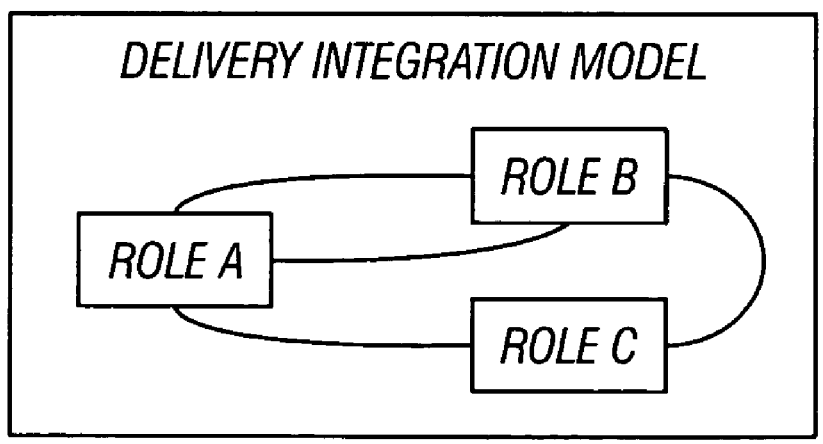
FIG. 5 illustrates a delivery integration model.

The aggregated multigraph G* is used to define a delivery model of the integration model, and has the following properties: G*=(V*, E*), where V*={v*|v* is a vertex category corresponding to a (business) role in the I-model} and E*={ e*|e* is an edge category corresponding to an interface between two roles in the I-model}. The aggregated multigraph G* has several conditions. There are at least two roles, and each role is assigned interfaces. Also, there is at least one interface between two roles in the I-model. FIG. 5 illustrates an example of a delivery model of the standardized integration model.

Figure 6:
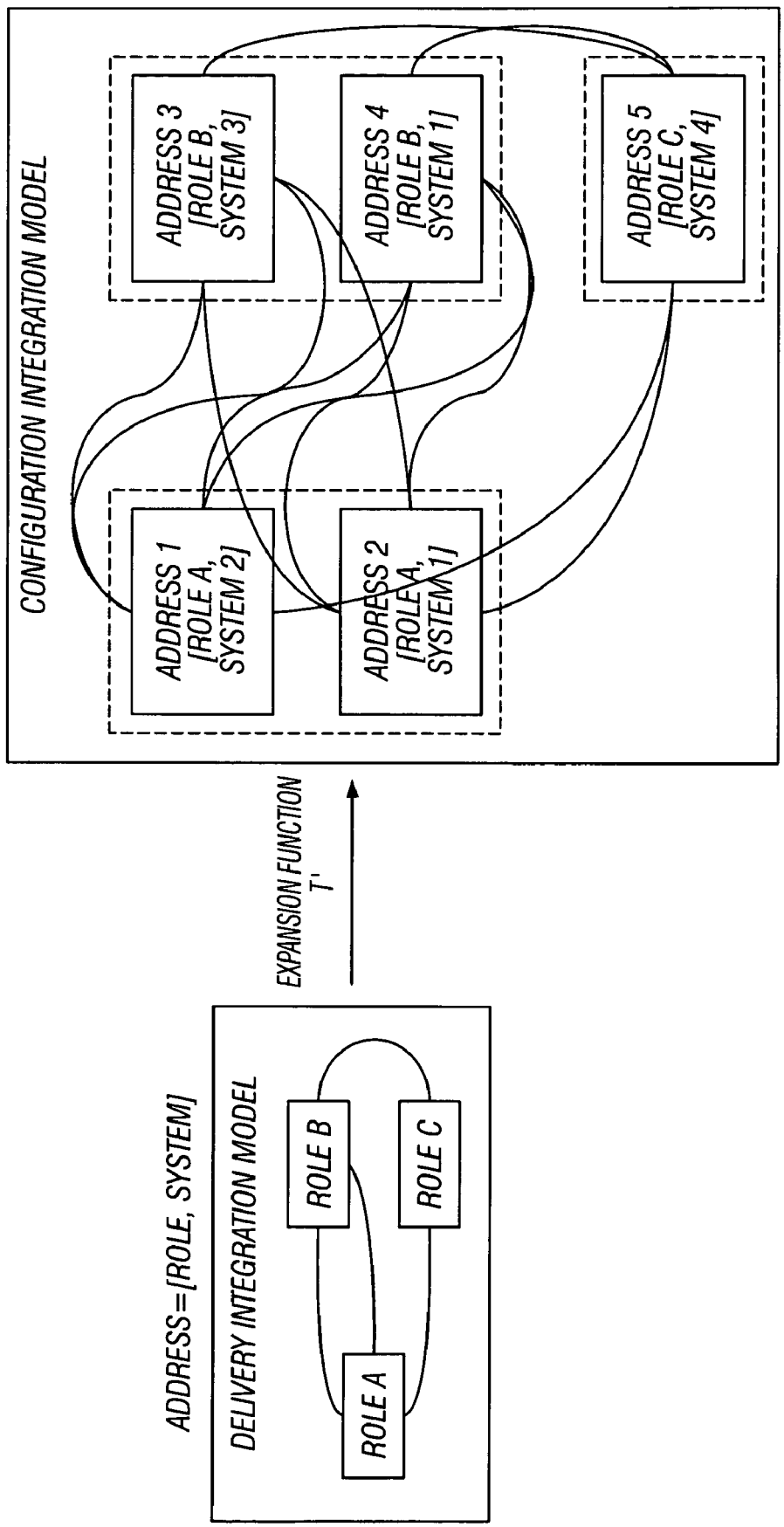
FIG. 6 illustrates an expansion transformation from a delivery model to a configuration model of the integration model.

An aggregated multigraph G* can be transformed into an expanded multigraph G, and vice versa. Given an aggregated multigraph $G^*=(V^*, E^*)$, the transformation $T':G^* \to G$ is executed as follows. First, the vertex categories are expanded as follows: transformation $T_v'=K_v':V^* \to P(V)$, that is, all vertex categories v* are assigned the vertices to be assigned (manually or automatically). Next, the edge categories are expanded as follows: transformation $T_E'$: $E^* \to P(E)$: $e^*=(v^*_x, v^*_y) \to K_v'(v^*_x) \times K_v'(v^*_y)$. Calculating the cross product of the vertex sets results in all edges in multigraph G. This makes it possible to calculate the edges in G automatically The above-described transformation can be used as a transformation (i.e. expansion) from a delivery model to a configuration model of the integration model, as illustrated in the expansion transformation shown in FIG. 6. All addresses result from the assignment of the required systems to the roles. Calculating the cross product of the addresses of the connected role categories for each interface category results in all interfaces between the addresses.

Figure 7:
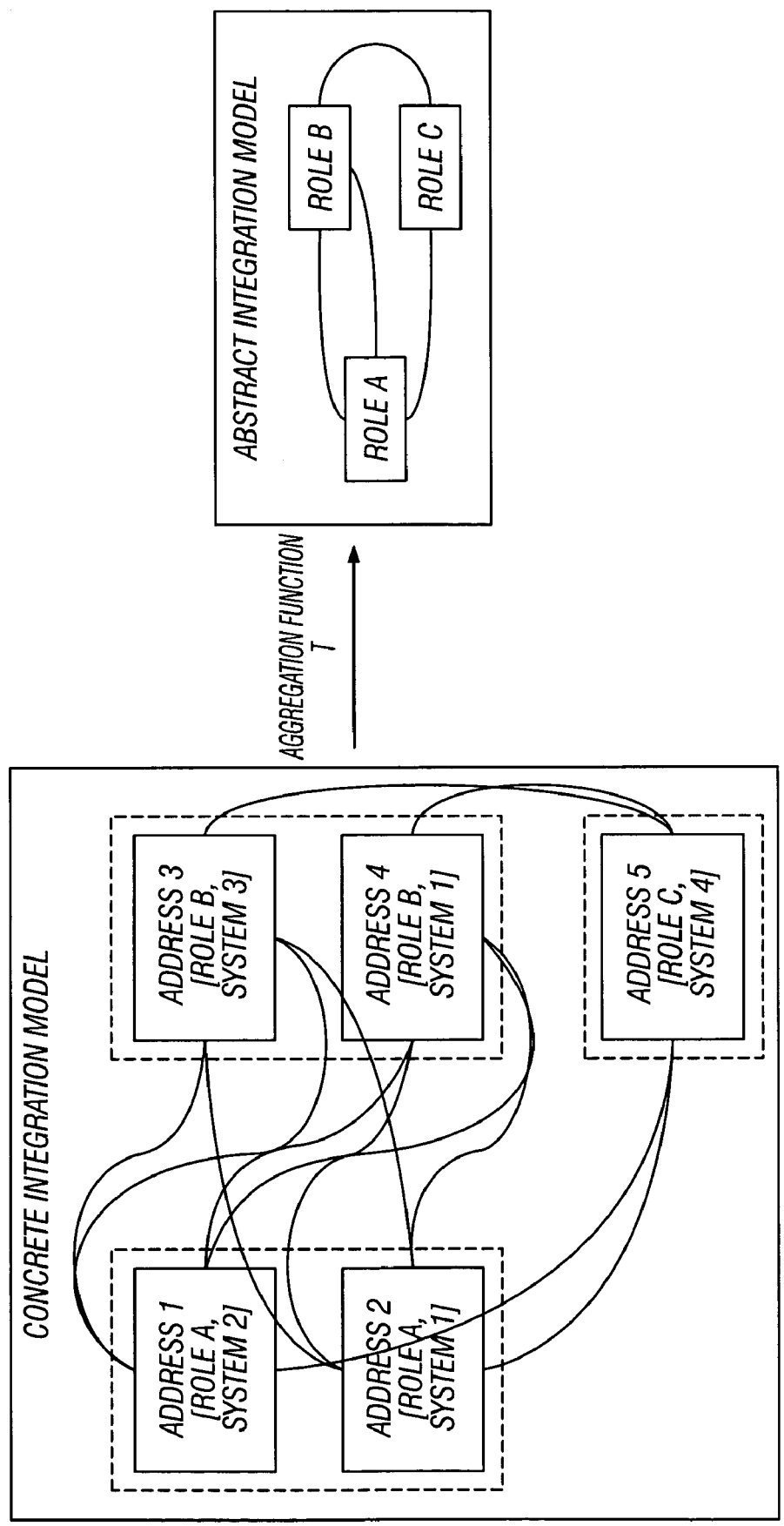
FIG. 7 illustrates a grouping of identical interfaces between two roles into one interface.

An expanded multigraph G can be aggregated into an aggregated multigraph G* in a reverse transformation. Given an expanded multigraph $G=(V, E)$, the transformation $T:G \to G^*$ is executed as follows. First, the vertices are aggregated to vertex categories as follows: transformation $T_v=K_v:V \to V^*$, that is, all vertices are grouped into vertex categories (manually or automatically). Then, the edges to edge categories are aggregated as follows: transformation $TE:E \to E^*:e=(v_i, v_j)c \to e^*=(v^*_x, v^*_y)c$ with $v^*x=K_v(v_i)$ and $v^*_y=K_v(v_j)$. The result is an aggregated multigraph G* representing relationships between edges and vertices at a more abstract level The aggregation transformation can be used for classification of addresses: all addresses that perform the same role are grouped into one role (i.e. creation of role categories). The aggregation transformation can also be used for classification of interfaces: all identical interfaces between two roles are grouped into one interface (i.e. creation of interface categories). These uses are illustrated in FIG. 7.

Figure 8:
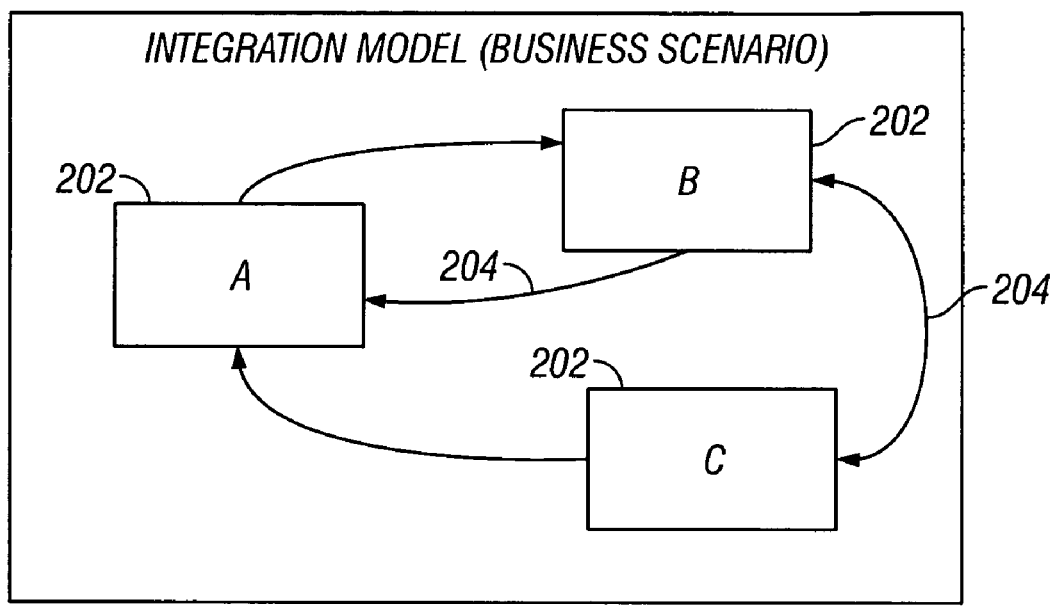
FIG. 8 shows an integration model of an integration scenario having roles connected by connections.

The standard integration model can be used to define distributed business processes at design time. FIG. 8 shows an integration model of an integration scenario 200, having roles 202 connected by connections 204. Each model includes a name that includes all roles 202 and connections 204 between roles 202, and a name for a business role. Each distributed business application or distributed business process is represented by one role. Each connection 204 is used for asynchronous messaging for data flow from one role 202 to at least one other role 202 in a request/response mode.

Each connection 204 is defined at design time, by at least one relation between a sender role and a receiver role, an asynchronous or synchronous communication mode, a definition of sender role and receiver role of a messaging call, one sender interface (IFout), one receiver interface (IFin), and one mapping for IFout to IFin.

The definition of a standardized integration model includes well defined characteristics. From the integration model, an integration scenario monitoring process can be generated. Accordingly, for each connection between a sender and a receiver, an additional asynchronous connection can be generated as an integration scenario monitor. The integration scenario monitor collects all connections in the scenario, and can monitor the message exchanges thereof.

Given an existing integration scenario, an integration scenario monitoring process can be automatically created. An integration model defines all necessary messages and mappings, and can be used for automatic scenario configuration. Correlation data on the inbound messages can be used to create instances of business processes. Status tracking is possible.

Although a few embodiments have been described in detail above, other modifications are possible. The logic flows depicted herein do not require the particular order shown, or sequential order, to achieve desirable results. Other embodiments may be within the scope of the following claims.

What is claimed is:

1. A system for integrating distributed business processes that govern message exchange between loosely coupled business applications, the system comprising:

a processor; and a memory coupled to the processor, the memory encoding one or more programs that cause the processor to effect an integration model having a delivery model that defines one or more design time business processes and a configuration model that defines a runtime configuration of the one or more design time business process, the configuration model including an expanded multigraph, the expanded multigraph being represented by $G=(V, E)$ with $V=\{v|v \text{ is a vertex}\}$, where $E=\{e|e \text{ is an edge}\}$, the vertices v corresponding to roles and events, the edges e corresponding to message exchange connections, the delivery model including an aggregated multigraph being represented by $G^*=(V^*, E^*)$ with $V^*=\{v^*|v^* \text{ is a vertex category}\}$ and where $E^*=\{e^*|e^* \text{ is an edge category}\}$, the vertex categories v* corresponding to categories for the vertices v in the expanded multigraph, the edge categories corresponding to categories for the edges e in the expanded multigraph.

2. A system in accordance with claim 1, further comprising a transformation module configured to transform the delivery model to the configuration model.

3. A system in accordance with claim 1, further comprising a first transformation module configured to transform the aggregated multigraph to the expanded multigraph.

4. A system in accordance with claim 1, further comprising a second transformation module configured to transform the expanded multigraph to the aggregated multigraph.

5. An integration scenario for integrating distributed business processes that govern message exchange between loosely coupled business applications, the integration scenario comprising:

a processor; and a memory coupled to the processor, the memory encoding one or more programs that cause the processor to effect:

a delivery integration model that defines one or more design time business processes; and a configuration integration model that defines a runtime configuration of the one or more design time business process;

the configuration model including an expanded multigraph, the expanded multigraph being represented by $G=(V, E)$ with $V=\{v|v \text{ is a vertex}\}$, where $E=\{e|e \text{ is an edge}\}$, the vertices v corresponding to roles and events, the edges e corresponding to message exchange connections, the delivery model including an aggregated multigraph being represented by $G^*=(V^*, E^*)$ with $V^*=\{v^*|v^* \text{ is a vertex category}\}$ and where $E^*=\{e^*|e^*$ is an edge category$\}$, the vertex categories $v^*$ corresponding to categories for the vertices v in the expanded multigraph, the edge categories corresponding to categories for the edges e in the expanded multigraph.

6. An integration scenario in accordance with claim 5, further comprising a transformation module configured to transform the delivery integration model to the configuration integration model.

7. An integration scenario in accordance with claim 5, further comprising a first transformation module configured to transform the aggregated multigraph to the expanded multigraph.

8. An integration scenario in accordance with claim 5, further comprising a second transformation module configured to transform the expanded multigraph to the aggregated multigraph.

9. A method for integrating distributed business processes that govern message exchange between loosely coupled business applications, the method comprising:
 defining one or more design time business processes;
 generating a delivery integration model according to the one or more design time business processes;
 defining a runtime configuration of the one or more design time business process; and
 generating a configuration integration model according to the runtime configuration of the one or more design time business processes in order to enable message exchange between the loosely coupled business applications,
 the configuration model including an expanded multigraph, the expanded multigraph being represented by $G=(V, E)$ with $V=\{v|v$ is a vertex$\}$, where $E=\{e|e$ is an edge$\}$, the vertices v corresponding to roles and events, the edges e corresponding to message exchange connections, the delivery model including an aggregated multigraph being represented by $G^*=(V^*, E^*)$ with $V^*=\{v^*|v^*$ is a vertex category$\}$ and where $E^*=\{e^*|e^*$ is an edge category$\}$, the vertex categories $v^*$ corresponding to categories for the vertices v in the expanded multigraph, the edge categories corresponding to categories for the edges e in the expanded multigraph.

10. A method in accordance with claim 9, further comprising transforming the delivery integration model to the configuration integration model.

11. A method in accordance with claim 9, further comprising transforming the aggregated multigraph to the expanded multigraph.

12. A method in accordance with claim 9, further comprising transforming the expanded multigraph to the aggregated multigraph.

* * * * *